United States Patent
Hiranuma (10) Patent No.: US 8,937,273 B2
(45) Date of Patent: Jan. 20, 2015

(54) PHOTOELECTRIC TRANSDUCER, IMAGE READING DEVICE HAVING A CONTROL UNIT WITH A RESET PULSE SWITCHING FROM A COLOR READING MODE TO A MONOCHROME READING MODE

(75) Inventor: Masahiro Hiranuma, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 271 days.

(21) Appl. No.: 13/547,806

(22) Filed: Jul. 12, 2012

(65) Prior Publication Data

US 2013/0026348 A1 Jan. 31, 2013

(30) Foreign Application Priority Data

Jul. 28, 2011 (JP) ................. 2011-165840

(51) Int. Cl.
| | |
|---|---|
| H01L 27/00 | (2006.01) |
| H01J 40/14 | (2006.01) |
| H04N 9/04 | (2006.01) |
| H04N 5/359 | (2011.01) |
| H04N 5/369 | (2011.01) |
| H04N 5/378 | (2011.01) |
| H04N 1/03 | (2006.01) |
| H04N 1/193 | (2006.01) |
| H04N 5/232 | (2006.01) |

(52) U.S. Cl.
CPC .............. *H04N 9/045* (2013.01); *H04N 5/359* (2013.01); *H04N 5/3692* (2013.01); *H04N 5/378* (2013.01); *H04N 1/03* (2013.01); *H04N 1/193* (2013.01); *H04N 5/23245* (2013.01)
USPC .................................. 250/208.1; 250/214 R (58) Field of Classification Search
USPC .............. 250/208.1, 214 LS, 214.1, 214 SW, 250/214 R; 348/307–310, 275, 281, 302; 257/183.1, 184, 226, 242, 431, 440, 257/444
See application file for complete search history.

(56) References Cited

U.S. PATENT DOCUMENTS

| | | | |
|---|---|---|---|
| 5,784,101 A | 7/1998 | Hasegawa | |
| 7,057,657 B1 | 6/2006 | Ishihara et al. | |
| 7,800,787 B2 * | 9/2010 | Shimizu | 358/474 |
| 7,936,485 B2 | 5/2011 | Hiranuma | |
| 8,130,428 B2 * | 3/2012 | Hamada et al. | 358/525 |
| 2007/0085921 A1 | 4/2007 | Kitagata et al. | |
| 2007/0229691 A1 | 10/2007 | Oshima et al. | |
| 2011/0058083 A1 | 3/2011 | Oshima et al. | |

FOREIGN PATENT DOCUMENTS

| | | |
|---|---|---|
| EP | 0 666 686 A2 | 8/1995 |
| JP | 4607657 | 10/2010 |

OTHER PUBLICATIONS

Extended European Search Report issued Sep. 9, 2013, in European Patent Application No. 12176075.5.

* cited by examiner

*Primary Examiner* — Georgia Y Epps
*Assistant Examiner* — Don Williams
(74) *Attorney, Agent, or Firm* — Oblon, Spivak, McClelland, Maier & Neustadt, L.L.P.

(57) ABSTRACT

A photoelectric transducer being capable of image reading in any one of a color reading mode and a monochrome reading mode includes a color reading sensor, a monochrome reading sensor, and an unnecessary-charge draining unit. The unnecessary-charge draining unit (32) drains unnecessary charges accumulated in the monochrome reading sensor or the color reading sensor therefrom at switching from the color reading mode to the monochrome reading mode or from the monochrome reading mode to the color reading mode.

6 Claims, 10 Drawing Sheets

COLOR/MONOCHROME
SWITCHING SIGNAL

PHOTOELECTRIC TRANSDUCER, IMAGE READING DEVICE HAVING A CONTROL UNIT WITH A RESET PULSE SWITCHING FROM A COLOR READING MODE TO A MONOCHROME READING MODE

CROSS-REFERENCE TO RELATED APPLICATIONS

The present application claims priority to and incorporates by reference the entire contents of Japanese Patent Application No. 2011-165840 filed in Japan on Jul. 28, 2011.

BACKGROUND OF THE INVENTION

1. Field of the Invention

The present invention relates to a photoelectric transducer that reads an image of an original or the like, and a device and a method for reading an image.

2. Description of the Related Art

An image reading device that reads an image of an original or the like typically includes a charge coupled device (CCD) and an analog front end (AFE) arranged downstream of the CCD. An output of the CCD is input to the AFE via alternating-current (AC)-coupling (via a capacitor connected in series therebetween). Accordingly, only an amount of change (AC) in the output of the CCD is conveyed to the AFE. Put another way, the amount of change in the output of the CCD, or, an output-fluctuation amount, is inevitably conveyed to the AFE. For instance, in a case where an overvoltage above an input voltage rating of the AFE is temporarily generated by the CCD, the overvoltage is directly conveyed to the AFE, causing degradation in characteristics of the AFE device or, at worst, device destruction to occur. Under the circumstance, such an overvoltage input to the AFE has been regarded as an important issue, and there are some known techniques for responding to the issue.

However, the conventional techniques aim at reducing an overvoltage that is developed as a result of at-a-dash emission of unnecessary charges accumulated during power-off of a CCD immediately after power-on of the CCD. Meanwhile, a four-line CCD that generally includes a color (R/G/B) sensor as well as a monochrome (black and white (BW)) sensor has a problem that an overvoltage is developed even in a state where power is kept to be supplied to the CCD. This overvoltage is developed immediately after mode switching between a color reading mode and a monochrome reading mode as a result of at-a-dash emission of unnecessary charges accumulated in one sensor of the sensors that has been at rest before the mode switching. The one sensor the BW sensor when the CCD has been in the color reading mode before the mode switching, while the one sensor is the R/G/B sensor when the CCD has been in the monochrome reading mode.

Meanwhile, when the technique used for switching the mode of the CCD from off state to on state is used for responding to the overvoltage that is developed at switching of the reading mode, it is required to use an additional control signal that is not a control signal for switching of the reading mode. Furthermore, this approach is also disadvantageous in requiring establishing a sequence involving these control signals, thereby making switching of the reading mode time consuming and control complicated.

Japanese Patent Application Laid-open No. 2006-314039 discloses a configuration aimed at reducing magnitude of an influence of an overvoltage input to an AFE. According to the configuration, a clamp circuit unit configured to set an input offset voltage of analog image data to a desired voltage level by charging and discharging an AC coupling capacitor at an input unit of an analog-signal-processing circuit unit. A fixing period over which the clamp unit fixes the input offset voltage to the desired voltage level is set such that the fixing period in a situation where on/off switching of the photoelectric transducer is performed is longer than the fixing period in a situation where the on/off switching is not performed. However, this approach cannot solve the problem that an overvoltage is developed at mode switching between the color reading mode and the monochrome reading mode of the CCD.

SUMMARY OF THE INVENTION

It is an object of the present invention to at least partially solve the problems in the conventional technology.

It is an object of the present invention to reduce an overvoltage at reading-mode switching between a color reading mode and a monochrome reading mode with a simpler configuration.

A photoelectric transducer being capable of image reading in any one of a color reading mode and a monochrome reading mode, the photoelectric transducer comprising: a color reading sensor; a monochrome reading sensor; and an unnecessary-charge draining unit that drains unnecessary charges accumulated in one of the monochrome reading sensor and the color reading sensor therefrom at switching from the color reading mode to the monochrome reading mode or the monochrome reading mode to the color reading mode.

An image reading device comprises: a photoelectric transducer that includes a color reading sensor, a monochrome reading sensor, and a signal-charge draining unit, the photoelectric transducer being capable of image reading is any one of a color reading mode and a monochrome reading mode; and a drive control unit that controls driving of the photoelectric transducer.

The signal-charge draining unit drains output signal charges of any one of the color reading sensor and the monochrome reading sensor therefrom while a reset pulse is asserted, the reset pulse being a pulse signal supplied from the drive control unit to the photoelectric transducer during image reading.

The drive control unit maintains the reset pulse being asserted at switching from the color reading mode to the monochrome reading mode or from the monochrome reading mode to the color reading mode.

An image reading method to be performed by an image reading device that includes a photoelectric transducer being capable of image reading in any one of a color reading mode and a monochrome reading mode and a drive control unit that controls driving of the photoelectric transducer, the photoelectric transducer including a color reading sensor, a monochrome reading sensor, and a signal-charge draining unit, the image reading method comprises: draining, performed by the signal-charge draining unit, output signal charges of any one of the color reading sensor and the monochrome reading sensor therefrom while a reset pulse is asserted, the reset pulse being a pulse signal supplied to the photoelectric transducer during the image reading; and maintaining, performed by the drive control unit, the reset pulse being asserted at switching from the color reading mode to the monochrome reading mode or from the monochrome reading mode to the color reading mode.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
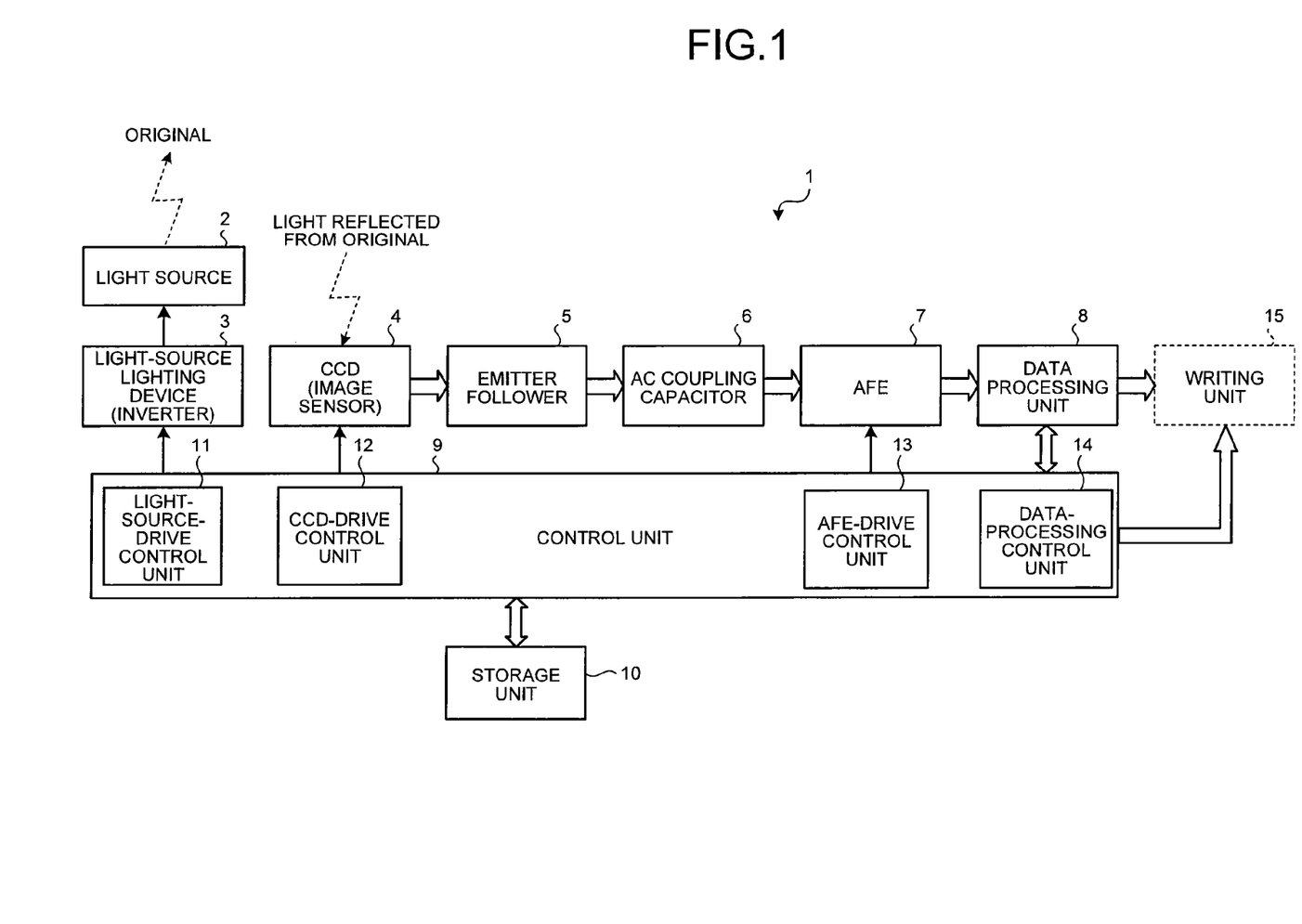
FIG. 1 is a block diagram illustrating the configuration of an image reading device according to an embodiment of the present invention.

Exemplary embodiments of the present invention are described in detail below with reference to the accompanying drawings. FIG. 1 is a block diagram illustrating the configuration of an image reading device according to an embodiment of the present invention. The image reading device 1 includes a light source 2, a light-source lighting device (inverter) 3, a CCD (image sensor) 4, an emitter follower 5, an AC coupling capacitor 6, an AFE 7, a data processing unit 8, a control unit 9, and a storage unit 10.

The light source 2 illuminates an original which is a target of image reading with light. The light-source lighting device 3 is a circuit for lighting the light source 2. The CCD 4 converts light reflected from the original into an electric signal (analog image signal). The configuration of the CCD 4 is described in detail later.

The emitter follower 5 matches impedance of the CCD 4 to that of the AFE 7. The AC coupling capacitor 6 eliminates an amount of a direct current (DC) offset voltage portion of an output voltage of the CCD 4 to make the voltage of an analog image signal output from the CCD 4 fall within an input voltage rating of the AFE 7.

The AFE (analog front end) 7 is an integrated circuit (IC) into which an analog-to-digital (A/D) conversion function, a sample and hold (S/H) circuit function, a gain adjustment function, and the like are integrated. Converting an analog image signal into a digital image signal that is to be input to the AFE 7 is one of important functions of the AFE 7. The AFE 7 may further include a clamp function that stabilizes a voltage level of the input analog image signal to a desired fixed voltage level, an auto gain control (AGC) control function that adjusts a peak level of the converted digital image signal to a desired level, a black offset adjusting function that sets a black level to a desired level, and the like. The black level is used as a reference of image signals.

The data processing section 8 performs various data processing such as shading correction and gamma correction on the digital image signal output from the AFE 7. The processed digital image data is either directly transmitted to a writing unit 15 or temporarily stored in the storage unit 10 via the control unit 9 and then transmitted to the writing unit 15 via the control unit 9.

The control unit 9 controls totally the image reading device 1. The control unit 9 includes a light-source-drive control unit 11, a CCD-drive control unit 12, an AFE-drive control unit 13, and a data-processing control unit 14.

The light-source-drive control unit 11 controls driving of the light-source lighting device 3 to control an amount of light emitted from the light source 2. Specifically, the light-source-drive control unit 11 controls the amount of light emitted from the light source 2 by inputting (applying) DC voltage or inputting a pulse-width modulation (PWM) signal to the light-source lighting device 3.

The CCD-drive control unit 12 controls driving of the CCD 4. Specifically, the CCD-drive control unit 12 selects one of a plurality of reading modes, in which the CCD 4 is to read an original, of the CCD 4 and indicates the selected mode to the CCD 4.

The AFE-drive control unit 13 controls driving of the AFE 7. The data-processing control unit 14 controls driving of the data processing unit 8. The storage unit 10 stores various types of drive setting data and digital image data having processed by the data processing unit 8. The storage unit 10 is a storage medium, e.g. a read only memory (ROM), a random access memory (RAM), or a hard disk drive (HDD). The various types of drive setting data are data that include drive setting data for the light source 2 and the light-source lighting device 3, drive setting data for the CCD 4, drive setting data for the AFE 7, and data-processing setting data for the data processing unit 8.

How the image reading device 1 reads an image is briefly described below. An original is illuminated with light emitted from the light source 2, and light reflected from the original enters into the CCD 4 via a plurality of mirrors (not shown). The CCD 4 is driven based on the drive setting data for the CCD 4 stored in the storage unit 10 to output an analog image signal that depends on an amount of the light entered into the CCD 4. The analog image signal is input to the AC coupling capacitor 6 via the emitter follower 5. An offset voltage of a fixed level is superimposed on the analog image signal in an output stage of the CCD 4. It is undesirable to directly input this analog image signal to the AFE 7 because the offset voltage is over the input voltage rating of the AFE 7. Hence, the AC coupling capacitor 6 is used to eliminate an amount of the offset voltage of the analog image signal so that an input-amount to the AFE 7 does not exceed the input voltage rating of the AFE 7.

Figure 2A:
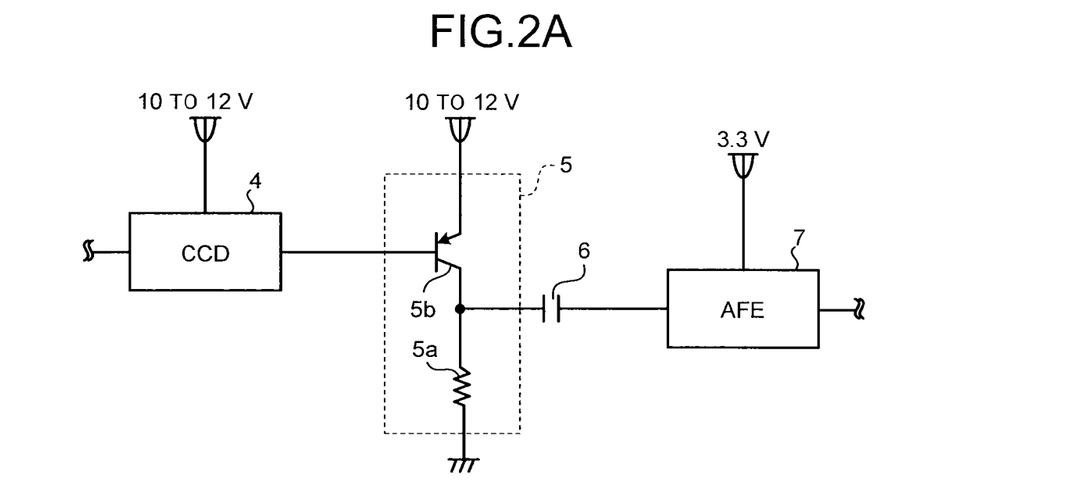
FIG. 2A is a diagram illustrating the configuration of an emitter follower illustrated in FIG. 1.
Figure 2B:
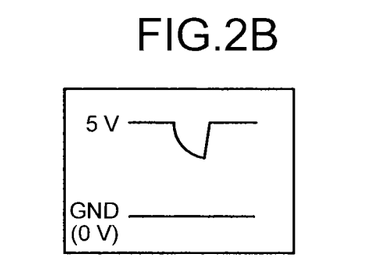
FIG. 2B is a diagram illustrating an analog image signal in an output stage of a CCD illustrated in FIG. 1.
Figure 2C:
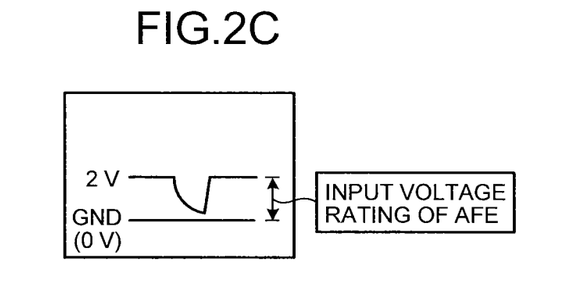
FIG. 2C is a diagram illustrating an analog image signal in an input state of an AFE illustrated in FIG. 1.

FIG. 2A is a diagram illustrating the configuration of the emitter follower 5. FIG. 2B is a diagram illustrating an analog image signal in the output state of the CCD 4. FIG. 2C is a diagram illustrating an analog image signal in an input state of the AFE 7. As illustrated in FIG. 2A, the emitter follower 5 includes a resistor 5a and a transistor 5b. The resistor 5a is connected to the ground potential at one end. The transistor 5b includes a first input/output terminal connected to the other end of the resistor 5a, a second input/output terminal connected to a supply voltage (here, 10 to 12 V), and a control terminal to which an output signal of the CCD 4 is to be input.

In FIG. 2A, for example, the supply voltage is 10 to 12 V. The analog image signal (see FIG. 2B) in the output stage of the CCD 4 is a 5 V offset voltage on which a analog image signal, which is a negative-going pulse, is superimposed. However, the supply voltage of the AFE 7 is 3.3 V; the input voltage rating ranges from 0 to 2 V; the offset voltage of the AFE 7 is 2 V. Therefore, it is undesirable to directly input the output signal of the CCD 4 to the AFE 7. Hence, the AC coupling capacitor 6 is used to convert the output signal of the CCD 4 into a signal (see FIG. 2C) which is the 2 V offset voltage with the negative-going analog image signal superimposed thereon. The converted signal is input to the AFE 7. Note that the above-mentioned voltage values are merely example values for describing the embodiment and applicable voltage values are not limited thereto.

In a case where the analog image signal in the output state of the CCD 4 has an amplitude equal to or higher than 2 V, when the offset voltage is set to 2 V, an amplitude value of a portion of the analog image signal that is over above 2 V undesirably reaches the ground potential (GND) to fall below a lower limit of the input voltage rating of the AFE 7, and adversely affects the AFE 7, resulting in degradation in characteristics of the AFE 7 or, at worst, device destruction. Accordingly, the amplitude of the analog image signal preferably stays within the range of the input voltage rating of the AFE 7.

However, there can be a case where an overvoltage over the amplitude range is developed in a transient state, e.g. during status transition of the CCD 4. For instance, the photoelectric transducer of the CCD 4 stores charges with responding to incident light irrespective of whether the power supply of the CCD 4 is on state or off state. This charge storage phenomenon occurs because a minute amount of ambient light is detected even when the light is not intentionally caused to enter the CCD 4. Accordingly, an overvoltage is developed at transition from power-off state to power-on state of the CCD 4 because unnecessary charges accumulated during power-off of the CCD 4 are emitted at a dash to the output terminal immediately after power-on state of the CCD 4.

Meanwhile, a four-line CCD that generally includes a color (R/G/B) sensor as well as a monochrome (BW) sensor has a problem that an overvoltage is developed even in a state where power supply to the CCD is maintained in on state. This overvoltage is developed immediately after mode switching between a color mode and a monochrome mode as a result of at-a-dash emission of unnecessary charges accumulated in one sensor of the sensors that has been at rest before the mode switching. The one sensor is the BW sensor when the CCD has been in the color mode before the mode switching, while the one sensor is the R/G/B sensor when the CCD has been in the monochrome mode.

Figure 3:
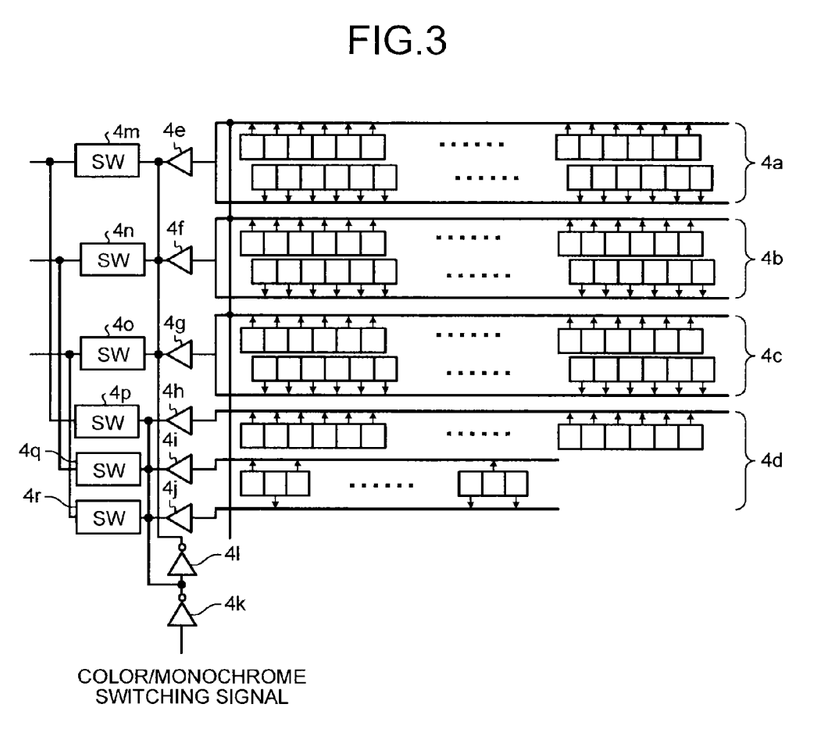
FIG. 3 is a diagram illustrating an example of the configuration of a four-line CCD used in the embodiment.

FIG. 3 is a diagram illustrating an example of the configuration of a four-line CCD used in the embodiment. The four-line CCD includes three pixel groups which are a pixel group 4a for red (R), a pixel group 4b for green (G), and a pixel group 4c for blue (B). The four-line CCD outputs signals of three channels in total in the color mode. The four-line CCD further includes a pixel group 4d dedicated to monochrome (BW) reading and outputs signals of one channel, or, the pixel group 4d, when the four-line CCD performs image reading in the monochrome mode. Some CCDs divide a pixel group into odd pixels (ODD) and even pixels (EVEN) to output signals through two channels in the monochrome mode. Such a CCD can read a monochrome image at a higher speed than a three-line CCD does.

Output signals of the red (R) pixel group 4a are amplified by an amplifier 4e. Output signals of the green (G) pixel group 4b are amplified by an amplifier 4f. Output signals of the blue (B) pixel group 4c are amplified by an amplifier 4g. Output signals of the monochrome (BW) pixel group 4d are amplified by amplifiers 4h, 4i, and 4j. The output signals of the amplifiers 4e to 4j are input to switches 4m to 4r. A color/monochrome switching signal is input to the switches 4p to 4r via an inverter 4k. The switches 4p to 4r output signals when the color/monochrome switching signal is in high level (monochrome mode). The color/monochrome switching signal is input to the switches 4m to 4o via the inverter 4k and an inverter 4l. The switches 4m to 4o output signals when the color/monochrome switching signal is in low level (color mode).

Switching between the color reading mode and the monochrome reading mode of the four-line CCD is performed by operating switches (SWs) in the CCD according to the color/monochrome switching signal coming from the CCD-drive control unit 12 (see FIG. 1). Image signals selected from image signals transmitted from the R/G/B/BW pixel groups according to the color/monochrome switching signal are externally output from the CCD.

A four-line CCD can include drive-clock input terminals for individually driving a shift gate and a transfer register (not shown) in a color-mode sensor (R/G/B) and a shift gate and a transfer register (not shown) in a monochrome-mode sensor (BW). An example of such a four-line CCD is disclosed in Japanese Patent Application Laid-open No. 2006-314039. The four-line CCD used in the embodiment is of this type.

Figure 4:
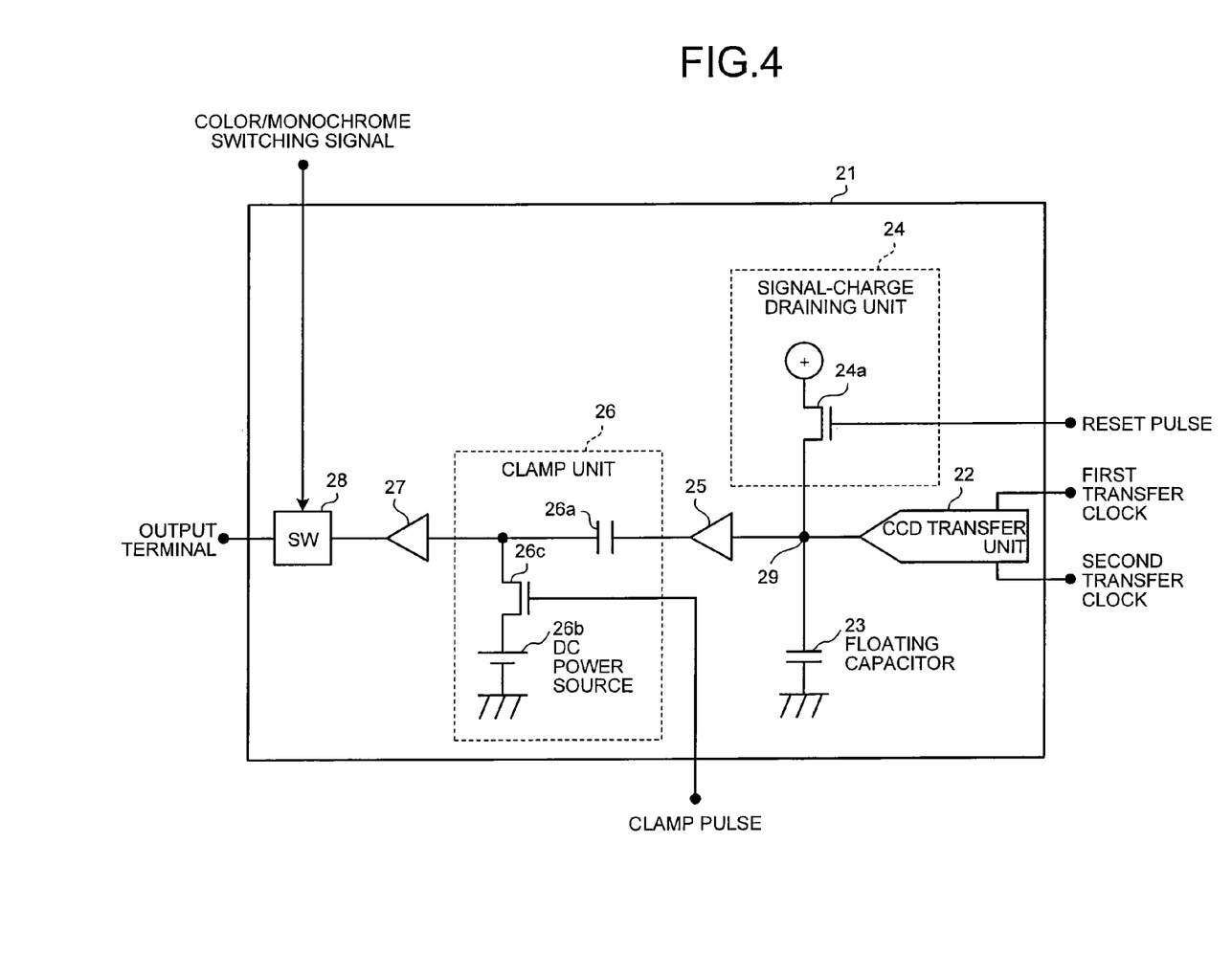
FIG. 4 is a diagram illustrating the configuration of an output circuit (of one channel) in the CCD.
Figure 5:
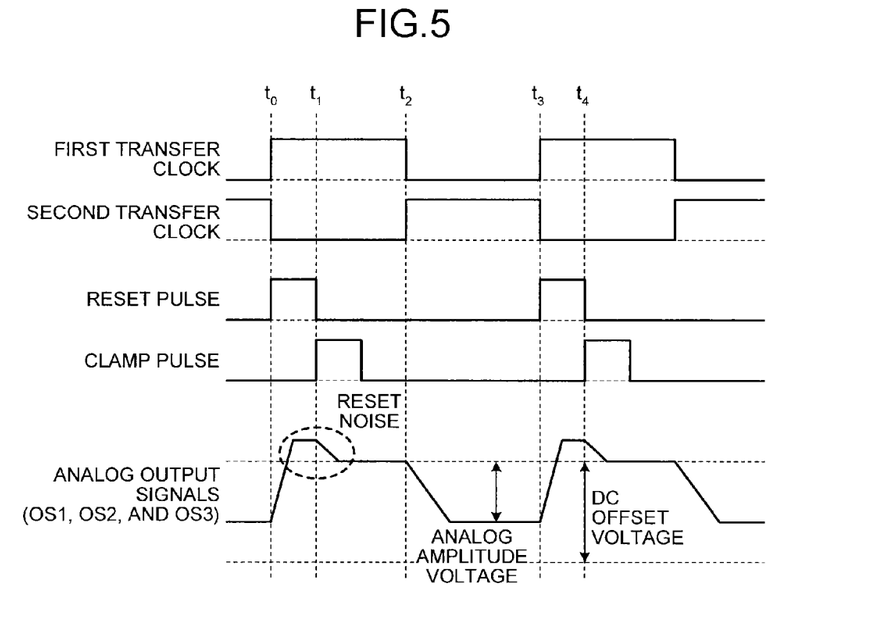
FIG. 5 is a timing chart for input/output signals of the output circuit illustrated in FIG. 4.

An example of a drive clock and a driving method for driving the CCD are described below with reference to FIGS. 4 and 5. FIG. 4 is a diagram illustrating the configuration of an output circuit (of one channel) in the CCD. FIG. 5 is a timing chart for input/output signals of the output circuit illustrated in FIG. 4.

Referring to FIG. 4, an output circuit 21 includes a CCD transfer unit 22, a floating capacitor 23, a signal-charge draining unit 24, amplifiers 25 and 27, a clamp unit 26, and a switch (SW) 28.

The CCD transfer unit 22 outputs signals coming from the pixels in the CCD in synchronization with first and second transfer clocks. The floating capacitor 23 is connected to be interposed between an output terminal of the CCD transfer unit 22 and the ground potential. The signal-charge draining unit 24 includes a transistor 24a. The transistor 24a includes a first input/output terminal connected to a junction 29 between the output terminal of the CCD transfer unit 22 and the floating capacitor 23, a second input/output terminal connected to a high-side supply voltage, and a control terminal to which a reset pulse is to be input. While the reset pulse is in high level, in the circuit configured in this way, the transistor 24a is on state and the potential of the junction 29 is pulled up to the high-side supply voltage, thereby signal charges (electrons) are drained. The amplifier 25 amplifies the voltage at the junction 29 and outputs the amplified voltage.

The clamp unit 26 includes a capacitor 26a, a DC power source 26b, and a transistor 26c. The capacitor 26a is connected at one end thereof to an output terminal of the amplifier 25. The DC power source 26b is connected at its low-side output terminal to the ground potential. The transistor 26c includes a first input/output terminal connected to a high-side output terminal of the DC power source 26b and a second input/output terminal connected to the other end of the capacitor 26a to serve as an output terminal of the clamp unit 26. While a clamp pulse is in high level, in the circuit configured in this way, the transistor 26c is on state, and the potential of the output terminal of the clamp unit 26 is clamped to the potential (DC offset voltage) of the DC power source 26b.

The amplifier 27 amplifies the voltage of the output terminal of the clamp unit 26 and outputs the amplified voltage. The switch 28 outputs the output signal of the amplifier 27 to an external output terminal according to the color/monochrome switching signal.

Referring to FIG. 5, the first transfer clock is an inverted signal of the second transfer clock. When the first transfer clock changes from low level to high level, the second transfer clock changes from high level to low level, and the reset pulse changes from low level to high level, at time $t_0$, the transistor 24a (see FIG. 4) in the signal-charge draining unit 24 becomes on state, and analog output signals (OS1, OS2, and OS3) change to high level. Thereafter, when the reset pulse changes from high level to low level and the clamp pulse changes from low level to high level, at time $t_1$, the transistor 24a (see FIG. 4) in the signal-charge draining unit 24 changes to off state, the transistor 26c (see FIG. 4) in the clamp unit 26 changes to on state, and the analog output signals (OS1, OS2, and OS3) are clamped to the DC offset voltage. An overshoot that occurs in the analog output signals (OS1, OS2, and OS3) at about time $t_1$ is referred to as a reset noise.

Subsequently, when the first transfer clock changes from high level to low level and the second transfer clock changes from low level to high level, at time $t_2$, an analog amplitude voltage that is directly proportional to light reflected from an original is added to the DC offset voltage and output as the analog output signals (OS1, OS2, and OS3). Thereafter, when the first transfer clock changes from low level to high level, the second transfer clock changes from high level to low level, and the reset pulse changes from low level to high level, at time $t_3$, the analog amplitude voltage is reset, and the reset noise is superimposed on the analog output signals (OS1, OS2, and OS3). Thereafter, when the clamp pulse changes from low level to high level, at time $t_4$, the analog output signals (OS1, OS2, and OS3) are clamped to be stabilized at the DC offset voltage which is the reference of output signals of the CCD.

Briefly, the charges accumulated in the transfer register (not shown) in each of the sensors (R/G/B/BW) of the CCD are sequentially shifted downstream of processes in the transfer register in synchronization with the first and second transfer clocks to be converted at a last stage in the transfer register, into an analog amplitude voltage and output. The reset pulse causes the signal-charge draining unit 24 to drain charges accumulated at the last-stage in the transfer register. The reset output signal is clamped to the DC offset voltage by the clamp pulse. A shift pulse (not shown) is a signal to be used to transfer charges of all the pixels accumulated in a photoelectric transducer array of the CCD to the shift register in the CCD. One cycle of the shift pulse corresponds to a storage time of a light signal at each pixel.

Figure 6:
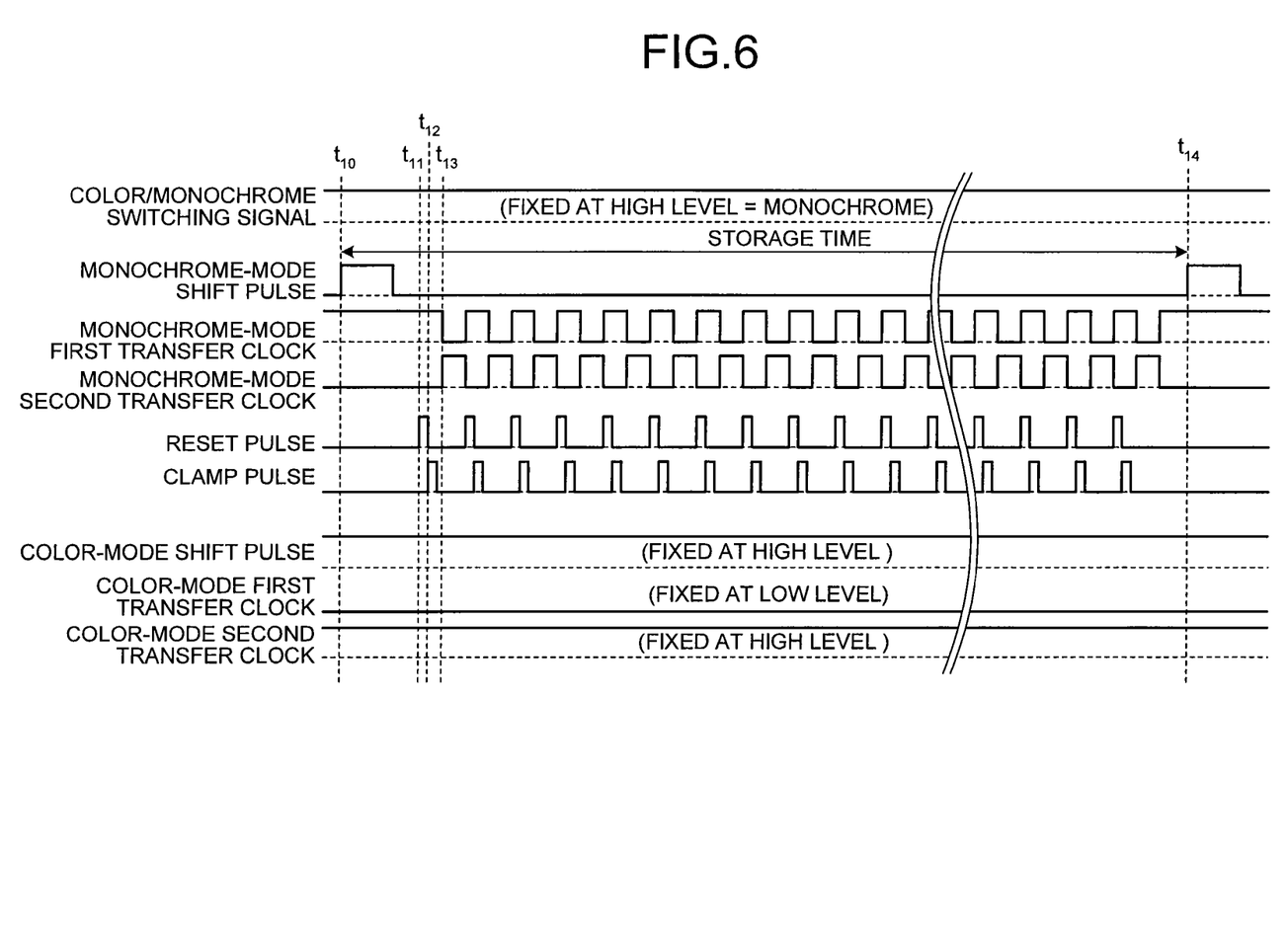
FIG. 6 is a timing chart illustrating an example of a method for driving the four-line CCD in a monochrome reading mode.

FIG. 6 is a timing chart illustrating an example of a method for driving the four-line CCD in the monochrome reading mode. The four-line CCD includes a set of a color-mode shift-pulse input terminal and color-mode transfer-clock input terminals and a set of a monochrome-mode shift-pulse input terminal and monochrome-mode transfer-clock input terminals separately.

The color/monochrome switching signal is fixed to high level, a color-mode shift pulse is fixed to low level, a color-mode first transfer clock is fixed to low level, and a color-mode second transfer clock is fixed to high level to perform the monochrome reading.

When the monochrome-mode shift pulse changes from low level to high level, at time $t_{10}$, charges of the pixels in the CCD are transferred to the shift register. From time $t_{11}$, the reset pulse changes with a predetermined pulse duty and a predetermined periodicity in a sequence of: low level→high level→low level→ . . . . From time $t_{12}$, the clamp pulse changes with the predetermined pulse duty and the predetermined periodicity in a sequence of: low level→high level→low level→ . . . . From time $t_{13}$, the monochrome-mode first transfer clock changes with a predetermined pulse duty and a predetermined periodicity in a sequence of: high level→low level→high level→ . . . , while the monochrome-mode second transfer clock changes with the predetermined pulse duty and the predetermined periodicity in a sequence of: low level→high level→low level→ . . . . As a result, a monochrome analog output signal is output. At time $t_{14}$, the monochrome-mode shift pulse changes from low level to high level. A period from time $t_{10}$ to $t_{14}$ corresponds to the storage time.

It is unnecessary to drive the color-mode sensor in the monochrome reading mode. Accordingly, the color-mode shift pulse and the color-mode first and second transfer clocks are fixed to high level or low level as illustrated in FIG. 6. Stopping operations of circuits that are not used in this way yields effects of reducing power consumption, reducing unwanted electromagnetic interference (EMI), and the like.

Although not shown, in the color reading mode, the color/monochrome switching signal is switched to low level (color mode); the monochrome-mode shift pulse and the monochrome-mode first and second transfer clocks are fixed to high level or low level; the color-mode shift pulse and the color-mode first and second transfer clocks are supplied as well as in the monochrome reading mode.

The reset pulse and the clamp pulse are shared between for the color reading mode and for the monochrome reading mode, in the example illustrated in FIG. 6. Alternatively, the CCD may include a set of a reset-pulse input terminal and a clamp-pulse input terminal for the color reading mode and that for the monochrome reading mode separately and be configured such that a reset pulse and a clamp pulse for the color reading mode and a reset pulse and a clamp pulse for the monochrome reading mode are driven individually.

Meanwhile, light strikes all the sensors in the four-line CCD, causing accumulation of charges. Accordingly, the driving method described above is disadvantageous in that an overvoltage is output at mode switching between the color reading mode and the monochrome reading mode because unnecessary charges accumulated in one sensor of the sensors that has been at rest before the mode switching are emitted at a dash immediately after the mode switching. The one sensor is the BW sensor when the CCD has been in the color reading mode before the mode switching, while the one sensor is the R/G/B sensor when the CCD has been in the monochrome reading mode. As having been described above, applying this overvoltage to the AFE 7 placed downstream of the CCD has an adverse effect because the amplitude value of the analog image signal falls below the lower limit of the input voltage rating of the AFE 7. This can result in degradation in characteristics or, at worst, device destruction of the AFE 7.

Figure 7:
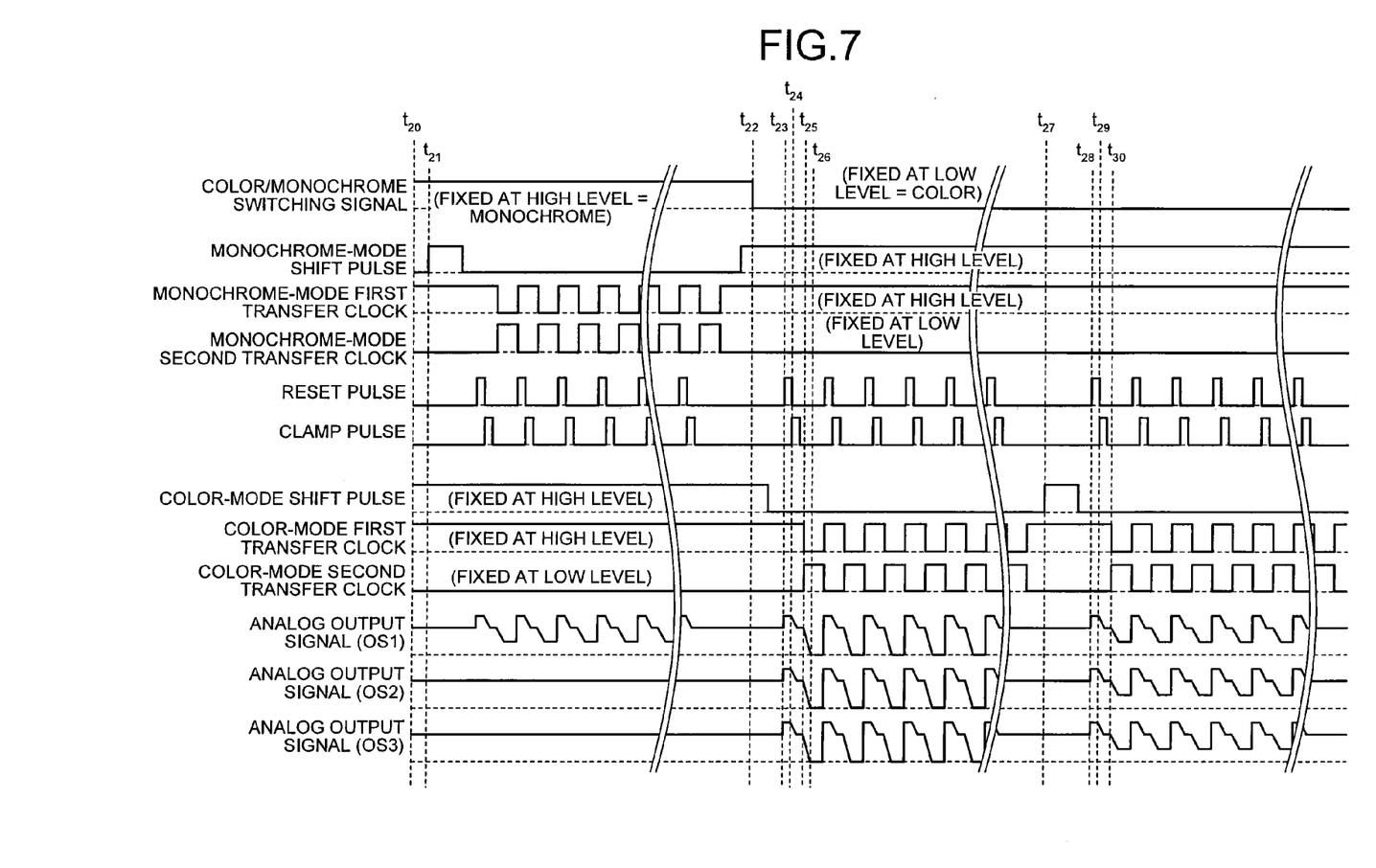
FIG. 7 is a timing chart illustrating a comparative example of the method for driving the four-line CCD.

FIG. 7 is a timing chart illustrating a comparative example of the method for driving the four-line CCD at mode switching from the monochrome reading mode to the color reading mode. The four-line CCD includes the set of the color-mode shift-pulse input terminal and the color-mode transfer-clock input terminals and the set of the monochrome-mode shift-pulse input terminal and the monochrome-mode transfer-clock input terminals separately.

At initial time $t_{20}$, the color/monochrome switching signal is in high level (monochrome mode). When the monochrome-mode shift pulse changes from low level to high level, at time $t_{21}$, charges of the pixels in the CCD are transferred to the shift register. Thereafter, when the reset pulse, the clamp pulse, and the monochrome-mode first and second transfer clocks are supplied to the CCD, the analog output signal (OS1) that is directly proportional to light reflected from an original is output as described above with reference to FIG. 5.

At time $t_{22}$, the color/monochrome switching signal changes from high level (monochrome mode) to low level (color mode). From time $t_{23}$, the reset pulse changes with a predetermined pulse duty and a predetermined periodicity in a sequence of: low level→high level→low level→ . . . . When the reset pulse changes high level, the reset noise described above is superimposed on the analog output signals (OS1, OS2, and OS3). From time $t_{24}$, the clamp pulse changes with the predetermined pulse duty and the predetermined periodicity in a sequence of: low level→high level→low level→ . . . . When the clamp pulse changes to high level, the analog output signals (OS1, OS2, and OS3) are clamped to the DC offset voltage as described above. From time $t_{25}$, the color-mode first transfer clock changes with a predetermined pulse duty and a predetermined periodicity in a sequence of: high level→low level→high level→ . . . , while the color-mode second transfer clock changes with the predetermined pulse duty and the predetermined periodicity in a sequence of: low level→high level→low level→ . . . . Then, charges accumulated in the R/G/B sensor that has been at rest from $t_{20}$ to $t_{22}$ are emitted, causing the amplitudes of the analog output signals (OS1, OS2, and OS3) to undesirably reach the ground potential (GND) at time $t_{26}$, and to fall undesirably below the lower limit of the input voltage rating of the AFE 7.

Thereafter, when a predetermined period of time has elapsed, emission of the charges accumulated in the R/G/B sensor is completed. At time $t_{27}$, the color-mode shift pulse changes from low level to high level. From time $t_{28}$, the reset pulse changes with the predetermined pulse duty and the predetermined periodicity in a sequence of: low level→high level→low level→ . . . . When the reset pulse changes to high level, the reset noise described above is superimposed on the analog output signals (OS1, OS2, and OS3). From time $t_{29}$, the clamp pulse changes with the predetermined pulse duty and the predetermined periodicity in a sequence of: low level→high level→low level→ . . . . When the clamp pulse changes to high level, the analog output signals (OS1, OS2, and OS3) are clamped to the DC offset voltage as described above. From time $t_{30}$, the color-mode first transfer clock changes with the predetermined pulse duty and the predetermined periodicity in a sequence of: high level→low level→high level→ . . . , while the color-mode second transfer clock changes with the predetermined pulse duty and the predetermined periodicity in a sequence of: low level→high level→low level→ . . . . Then, the analog output signals (OS1, OS2, and OS3) directly proportional to light reflected from an original are output.

The example in which the monochrome reading mode is switched to the color reading mode has been described with reference to FIG. 7. A driving method for a situation where the color reading mode is switched to the monochrome reading mode is similar to that described above except that the monochrome-mode drive signals and the color-mode drive signals are to be interchanged.

Figure 8:
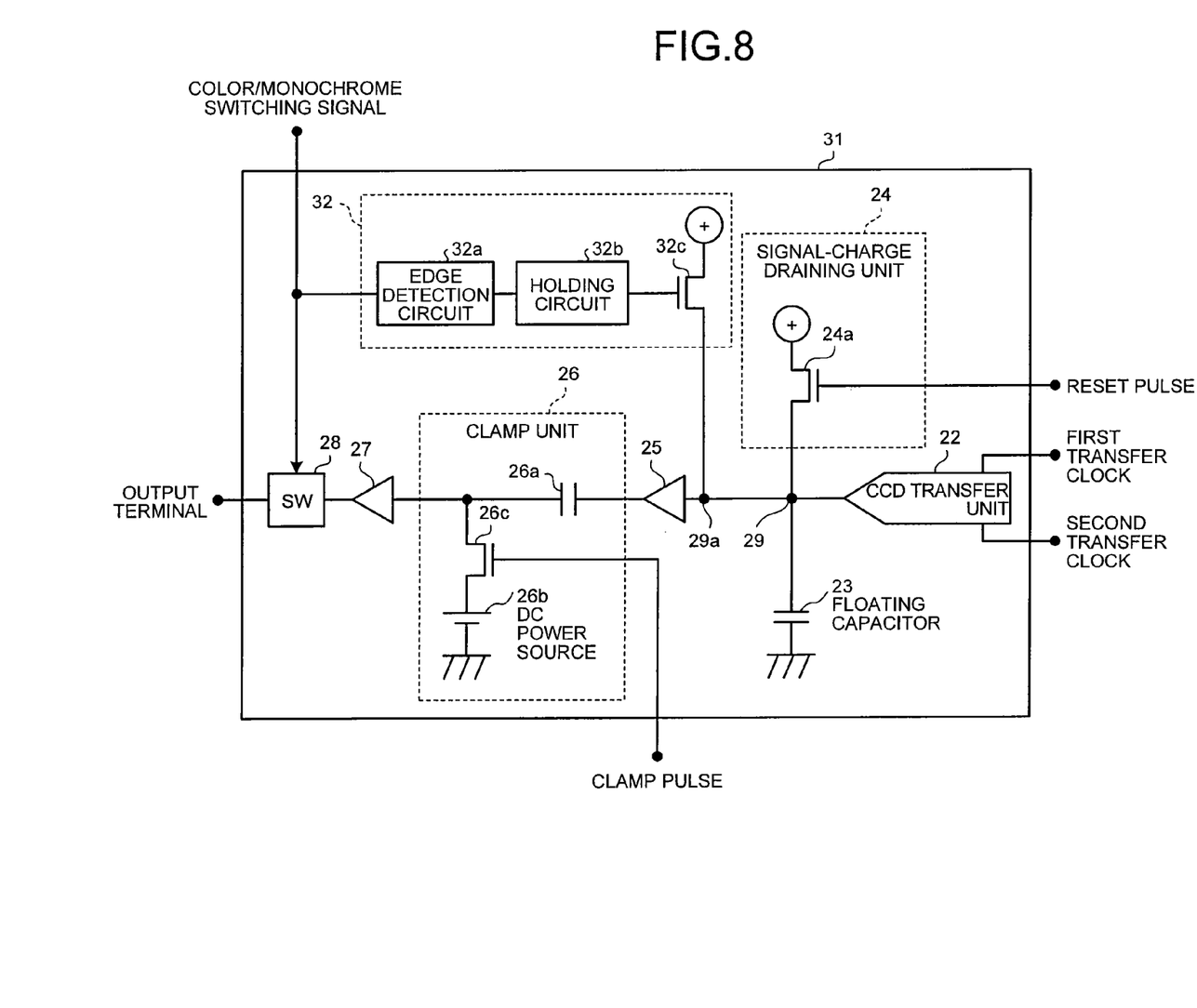
FIG. 8 is a diagram illustrating the configuration of an output circuit (of one channel) in the four-line CCD according to the embodiment.

FIG. 8 is a diagram illustrating the configuration of an output circuit (of one channel) in the four-line CCD according to the embodiment. Referring to FIG. 8, an output circuit 31 includes an unnecessary-charge draining unit 32 in addition to constituents of the output circuit 21 described above and illustrated in FIG. 4. The unnecessary-charge draining unit 32 includes an edge detection circuit 32a, a holding circuit 32b, and a transistor 32c.

The color/monochrome switching signal is input to the edge detection circuit 32a. The edge detection circuit 32a outputs a high-level signal to the holding circuit 32b upon detection of an edge of the color/monochrome switching signal. The holding circuit 32b holds the high-level signal fed from the edge detection circuit 32a for a predetermined period of time $T_{WAIT}$, and thereafter outputs the high-level signal to a control terminal of the transistor 32c. The predetermined time $T_{WAIT}$ satisfies Expression (1) below:

$$T_{WAIT} > Q_{ALL} Q_{REG} \times T_{line} \tag{1}$$

where $Q_{ALL}$ is a total of amount of charges (which is a value specific to each type of the CCD) being storable in all circuits of one channel in the CCD, $Q_{REG}$ is a total amount of charges (which is a value specific to each type of the CCD) being storable in a line of the shift register in the CCD, and $T_{line}$ is a minimum storage time (in minutes) necessary to shift all the charges in the line of the shift register.

The transistor 32c includes a first input/output terminal connected to a junction 29a between the amplifier 25 and the junction 29 and a second input/output terminal connected to a high-side supply voltage. In the circuit configured as described above, the junction 29a is pulled up to the high-side supply voltage for a predetermined period of time after the color/monochrome switching signal changes from high level to low level or from low level to high level.

This prevents such an undesirable situation that the amplitudes of the analog output signals (OS1, OS2, and OS3) reach the ground potential (GND) as in the case from time $t_{26}$ to time $t_{27}$ of the example illustrated in FIG. 7. Accordingly, degradation in characteristics or, at worst, device destruction in the AFE 7 placed downstream of the CCD 4 is prevented.

Figure 9:
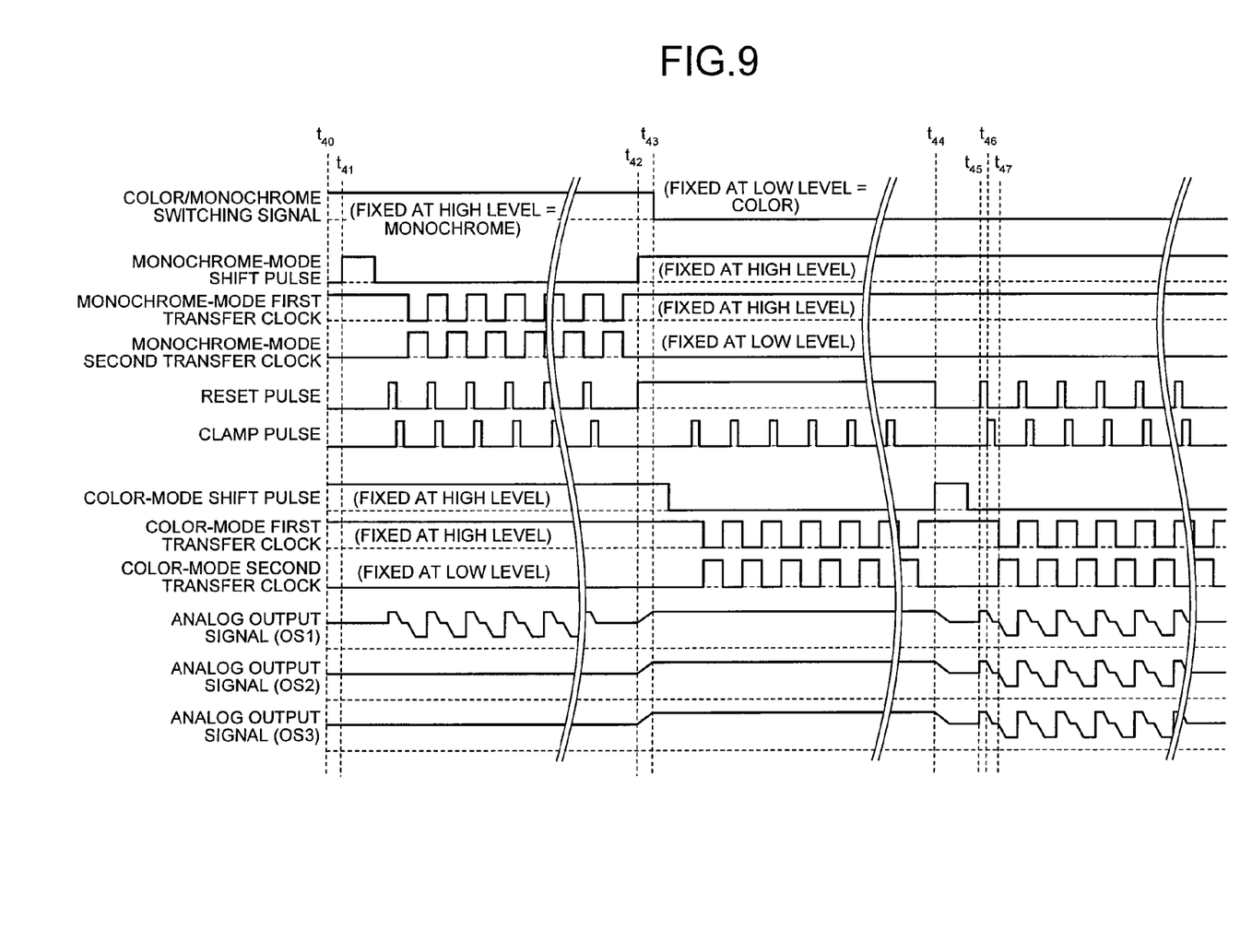
FIG. 9 is a timing chart illustrating a method for driving the four-line CCD according to the embodiment.

FIG. 9 is a timing chart illustrating a method for driving the four-line CCD according to the embodiment at mode switching from the monochrome reading mode to the color reading mode. The four-line CCD includes the set of the color-mode shift-pulse input terminal and the color-mode transfer-clock input terminals and the set of the monochrome-mode shift-pulse input terminal and the monochrome-mode transfer-clock input terminals separately.

At initial time $t_{40}$, the color/monochrome switching signal is in high level (monochrome mode). When the monochrome-mode shift pulse changes from low level to high level, at time $t_{41}$, charges of the pixels in the CCD are transferred to the shift register. Thereafter, the analog output signal (OS1) that is directly proportional to light reflected from an original is output as described above with reference to FIG. 5 when the reset pulse, the clamp pulse, and the monochrome-mode first and second transfer clocks are supplied to the CCD.

At time $t_{42}$, the reset pulse is asserted (high level). In response thereto, the transistor 24a (see FIG. 4) in the signal-charge draining unit 24 changes to on state, and the potential of the junction 29 is pulled up to the high-side supply voltage. This causes the analog output signals (OS1, OS2, and OS3) to change to high level.

At time $t_{43}$, the color/monochrome switching signal changes from high level (monochrome reading mode) to low level (color reading mode). Thereafter, the clamp pulse changes with a predetermined pulse duty and a predetermined periodicity in a sequence of: low level→high level→low level→ . . . ; the color-mode first transfer clock changes with a predetermined pulse duty and a predetermined periodicity in a sequence of: high level→low level→high level→ . . . ; the color-mode second transfer clock changes with the predetermined pulse duty and the predetermined periodicity in a sequence of: low level→high level→low level→ . . . . Note that the analog output signals (OS1, OS2, and OS3) remain in high level because the reset pulse is kept asserted (high level).

When the reset pulse is negated (low) at time $t_{44}$ after a lapse of the predetermined time $T_{WAIT}$ from time $t_{43}$, the analog output signals (OS1, OS2, and OS3) change to the DC offset voltage. The predetermined time $T_{WAIT}$ satisfies Expression (1) described above. When the color-mode shift pulse changes from low level to high level, charges of the pixels in the CCD are transferred to the shift register. From time $t_{45}$, the reset pulse changes with the predetermined pulse duty and the predetermined periodicity in a sequence of: low level→high level→low level→ . . . . When the reset pulse changes to high level, the reset noise described above is superimposed on the analog output signals (OS1, OS2, and OS3). From time $t_{46}$, the clamp pulse changes with the predetermined pulse duty and the predetermined periodicity in a sequence of: low level→high level→low level→ . . . . When the clamp pulse changes to high level, the analog output signals (OS1, OS2, and OS3) are clamped to the DC offset voltage as described above. From time $t_{47}$, the color-mode first transfer clock changes with the predetermined pulse duty and the predetermined periodicity in a sequence of: high level→low level→high level→ . . . , while the color-mode second transfer clock changes with the predetermined pulse duty and the predetermined periodicity in a sequence of: low level→high level→low level→ . . . . Then, the analog output signals (OS1, OS2, and OS3) directly proportional to light reflected from an original are output.

An overvoltage that can be developed immediately after switching from the monochrome reading mode to the color reading mode can be prevented by performing resetting of the R/G/B sensor where unnecessary charges accumulated as described above at about time when the monochrome reading mode is switched to the color reading mode. This leads to prevention of degradation in characteristics or, at worst, device destruction in the AFE 7 placed downstream of the CCD. Furthermore, it is unnecessary to drive the set of the color-mode shift pulse and the color-mode transfer clocks and the set of the monochrome-mode shift pulse and the monochrome-mode transfer clocks simultaneously. Accordingly, this method is also advantageous in not increasing power consumption and additional unwanted electromagnetic interference (EMI) of the drive circuits as compared with those of the driving method illustrated in FIG. 7.

Meanwhile, a driving method for a situation where the color reading mode is switched to the monochrome reading mode is similar to that described above except that the monochrome-mode drive signals illustrated in FIG. 9 are to be interchanged with the color-mode drive signals. The reset pulse and the clamp pulse are shared between the color reading mode and the monochrome reading mode in the example illustrated in FIG. 9. Alternatively, the four-line CCD may include a set of a reset-pulse input terminal and a clamp-pulse input terminal for the color mode and that for the monochrome reading mode separately and be configured such that a color-mode reset pulse is kept to be asserted before switching from the monochrome reading mode to the color reading mode.

Figure 10:
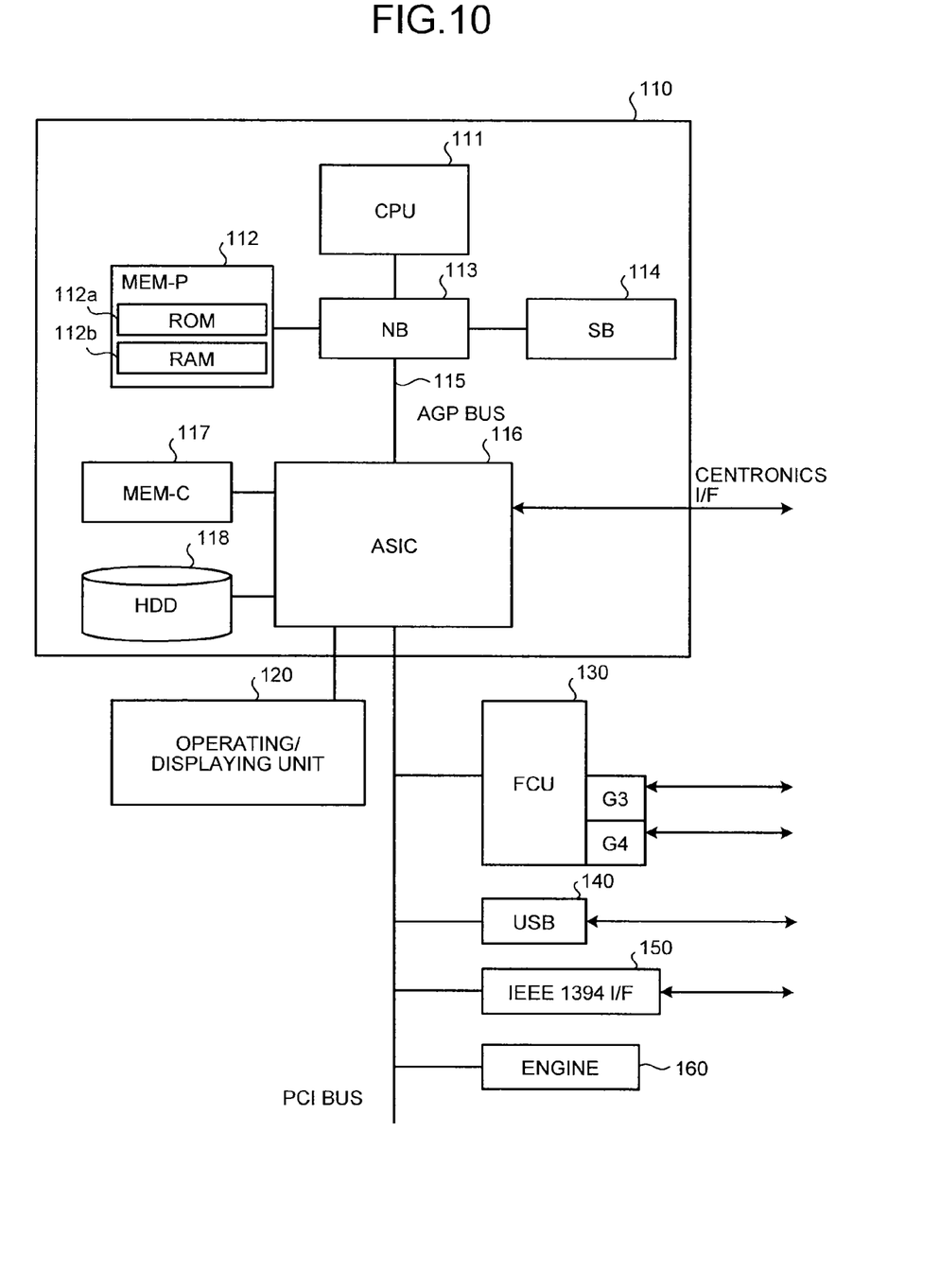
FIG. 10 is a block diagram illustrating a hardware configuration of an MFP according to the embodiment.

FIG. 10 is a block diagram illustrating a hardware configuration of a multi-function peripheral (MFP) which is an example of an imaging forming apparatus that includes the image reading device according to the embodiment. As illustrated in FIG. 10, the MFP includes a controller 110 and an engine unit (Engine) 160 that are connected to each other with a PCI (peripheral component interface) bus. The controller 110 is a controller that controls controlling totally the MFP, drawing, communication, and inputs from an operating unit (not shown). The engine unit 160 is a printer engine or the like that is connectable to the PCI bus. Examples of the engine unit 160 include a monochrome plotter, a one-drum color plotter, a four-drum color plotter, a scanner (corresponding to the image reading device), and a facsimile unit. Note that the engine section 160 includes not only what is called as an engine unit such as the plotter, but also an image processing unit for processing an error diffusion, a gamma conversion, and the like.

The controller 110 includes a CPU (central processing unit) 111, a north bridge (NB) 113, a system memory (hereinafter, "MEM-P") 112, a south bridge (SB) 114, a local memory (hereinafter, "MEM-C") 117, an application-specific integrated circuit (ASIC) 116, and an HDD 118. An AGP (accelerated graphics port) bus 115 connects between the NB 113 and the ASIC 116. The MEM-P 112 further includes a ROM (Read Only Memory) 112a and a RAM (Random Access Memory) 112b.

The CPU 111 controls the MFP totally and includes a chipset that includes the NB 113, the MEM-P 112, and the SB 114. The CPU 111 is connected to other devices via the chipset.

The NB 113 is a bridge for connecting the CPU 111 to the MEM-P 112, the SB 114, and the AGP 115. The NB 113 includes a memory controller, a PCI master, and an AGP target. The memory controller controls reading and writing from and to the MEM-P 112.

The MEM-P 112 is a system memory being a Read Only Memory that is used as a storage memory stores therein computer programs and data, an expansion memory for expanding computer programs and data, and a drawing memory for a printer, and the like, and includes the ROM 112a and the RAM 112b. The RAM 112b is a writable and readable memory that is used as an expansion memory for expanding computer programs and data and a drawing memory for the printer, and the like.

The SB 114 is a bridge for connecting the NB 113 to PCI devices and peripheral devices. The SB 114 is connected to the NB 113 via the PCI bus, and the PCI bus to which a network interface (I/F) unit and the like are also connected.

The ASIC 116 is an IC (Integrated Circuit) for image processing and includes a hardware component for the image processing. The ASIC 116 functions as a bridge that connects the AGP 115, the PCI bus, the HDD 118, and the MEM-C 117 with each other. The ASIC 116 includes a PCI target and an AGP master, an arbiter (ARB) which is a core of the ASIC 116, a memory controller that controls the MEM-C 117, a plurality of DMACs (direct memory access controllers) that performs image data rotation and the like using a hardware logic or the like, and a PCI unit that transfers data between the engine section 160 and the ASIC 116 via the PCI bus. A FCU (facsimile control unit) 130, a universal serial bus (USB) 140, and an IEEE 1394 (Institute of Electrical and Electronics Engineers 1394) I/F 150 are connected to the ASIC 116 via the PCI bus. An operating/displaying unit 120 is directly connected to the ASIC 116.

The MEM-C 117 is a local memory for use as a buffer for storing copy images and codes. The HDD 118 is a storage unit for accumulating image data, computer programs, font data, and forms.

The AGP 115 is a bus interface for a graphics accelerator card introduced to speed up graphics operations and allows direct access to the MEM-P 112 with a high throughput, thereby speeding up operations related to the graphic accelerator card.

An image reading computer program to be executed by the image reading device according to the embodiment can be provided as being preinstalled in a ROM or the like. The image reading computer program to be executed by the image reading device according to the embodiment can be provided as being recorded in a computer-readable recording medium such as a compact disc (CD)-ROM, a flexible disk (FD), a CD-R (CD recordable disk), or a DVD (digital versatile disk) in an installable or executable format.

The image reading computer program to be executed by the image reading device according to the embodiment can be stored in a computer connected to a network such as the Internet so that the computer program is provided by downloading over the network. The image reading computer program to be executed by the image reading device according to the embodiment can be provided or distributed via a network such as the Internet.

The image reading computer program to be executed by the image reading device according to the embodiment has a module structure made of the above-described units (the light-source-drive control unit, the CCD-drive control unit, the AFE-drive control unit, and the data-processing control unit). From a viewpoint of actual hardware, the CPU (processor) reads the image reading computer program from the ROM and executes it, thereby loading each of the units onto a main storage unit so that the light-source-drive control unit, the CCD-drive control unit, the AFE-drive control unit, and the data-processing control unit are generated on the main storage unit.

In the embodiment, an example in which the image reading device according to an aspect of the present invention is applied to an MFP that has at least two of a copier function, a facsimile function, a scanner function, and a printer function has been described. However, application is not limited thereto, and the image reading device is applicable to any image forming apparatus, such as a copier, a printer, a scanner, and a facsimile machine.

According to an aspect of the present invention, an overvoltage that is developed at reading-mode switching between a color reading mode and a monochrome reading mode can be reduced with a simple configuration. Accordingly, effects of reducing degradation in characteristics and destruction of a circuit downstream of a photoelectric transducer are yielded.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading device comprising:
a photoelectric transducer that includes a color reading sensor, a monochrome reading sensor, and a signal-charge draining unit, the photoelectric transducer being configured to read images in any one of a color reading mode and a monochrome reading mode; and
a drive control unit that controls driving of the photoelectric transducer, wherein
the signal-charge draining unit drains output signal charges of any one of the color reading sensor and the monochrome reading sensor therefrom, based on a reset pulse being a pulse signal with a predetermined pulse width that is output for every one pulse of a transfer signal supplied with a pulse shape from the drive control unit during image reading, and
the drive control unit outputs the reset pulse with a pulse width larger than the predetermined pulse width at switching from the color reading mode to the monochrome reading mode or from the monochrome reading mode to the color reading mode.

2. The image reading device according to claim 1, wherein
the drive control unit asserts the reset pulse before the drive control unit performs the switching from the color reading mode to the monochrome reading mode or from the monochrome reading mode to the color reading mode, and
the drive control unit negates the reset pulse when a predetermined period of time has elapsed since the switching.

3. The image reading device according to claim 2, wherein the predetermined period of time satisfies a following condition:

$$T_{WAIT} > Q_{ALL}/Q_{REG} \times T_{line}$$

where $T_{WAIT}$ is the predetermined period of time in minutes, $Q_{ALL}$ is a total amount of charges being storable in all circuits of one channel including a plurality of pixels that receive light of a predetermined color in the photoelectric transducer, $Q_{REG}$ is a total amount of charges being storable in a line of a shift register in the photoelectric transducer, and $T_{line}$ is a minimum storage time in minutes being necessary to transfer all the charges in the line of the shift register.

4. An image reading method to be performed by an image reading device that includes a photoelectric transducer being configured to read images in any one of a color reading mode and a monochrome reading mode and a drive control unit that controls driving of the photoelectric transducer, the photoelectric transducer including a color reading sensor, a monochrome reading sensor, and a signal-charge draining unit, the image reading method comprising:
draining, performed by the signal-charge draining unit, output signal charges of any one of the color reading sensor and the monochrome reading sensor therefrom, based on a reset pulse being a pulse signal with a predetermined pulse width that is output for every one pulse of a transfer signal supplied with a pulse shape during the image reading; and
outputting, performed by the drive control unit, the reset pulse with a pulse width larger than the predetermined pulse width at switching from the color reading mode to the monochrome reading mode or from the monochrome reading mode to the color reading mode.

5. The image reading method according to claim 4, wherein
asserting, performed by the drive control unit, the reset pulse before the drive control unit performs the switching from the color reading mode to the monochrome reading mode or from the monochrome reading mode to the color reading mode, and
negating, performed by the drive control unit, the reset pulse when a predetermined period of time has elapsed since the switching.

6. The image reading method according to claim 5, wherein the predetermined period of time satisfies a following condition:

$$T_{WAIT} > Q_{ALL}/Q_{REG} \times T_{line}$$

where $T_{WAIT}$ is the predetermined period of time in minutes, $Q_{ALL}$ is a total amount of charges being storable in all circuits of one channel including a plurality of pixels that receive light of a predetermined color in the photoelectric transducer, $Q_{REG}$ is a total amount of charges being storable in a line of a shift register in the photoelectric transducer, and $T_{line}$ is a minimum storage time in minutes being necessary to transfer all the charges in the line of the shift register.

* * * * *